Nov. 14, 1933.      R. C. BERGVALL      1,935,259
STABILITY PRESERVING MEANS FOR TRANSMISSION SYSTEMS
Filed Jan. 24, 1931      2 Sheets-Sheet 2
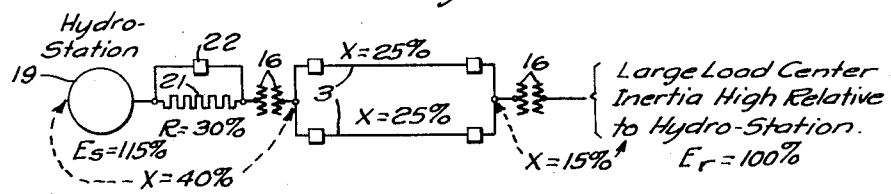
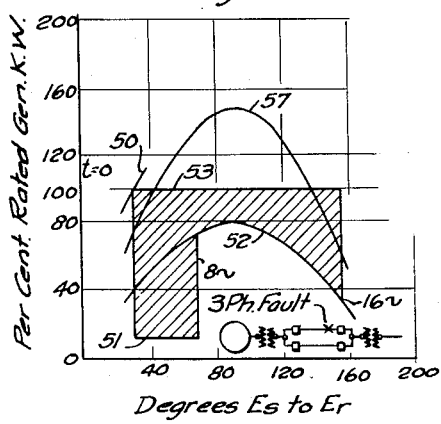
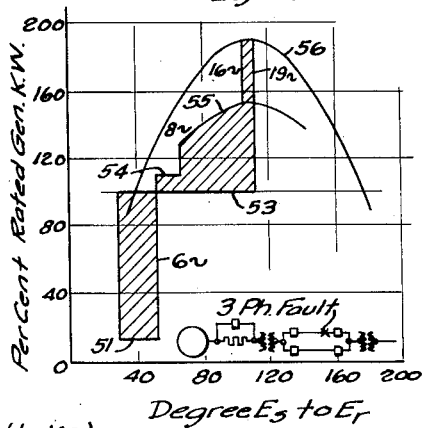
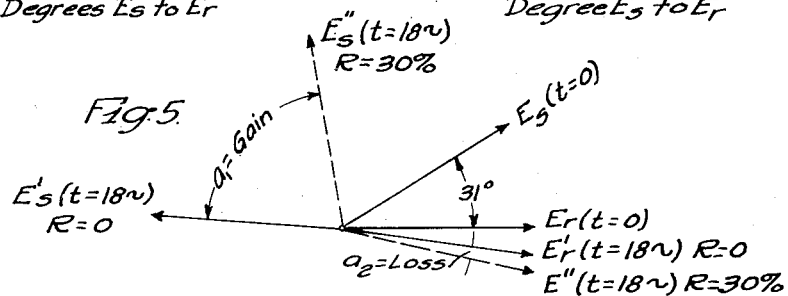
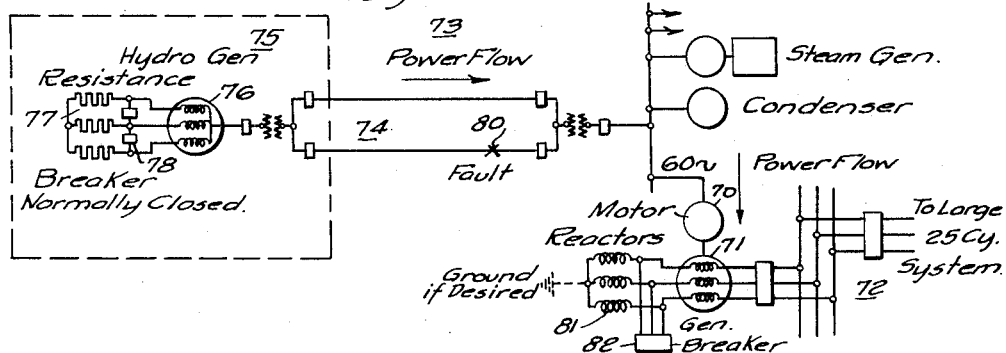
WITNESSES.
Leon J. Jaza
O. B. Buchanan
INVENTOR
Royal C. Bergvall.
BY
Wesley G. Carr
ATTORNEY Patented Nov. 14, 1933

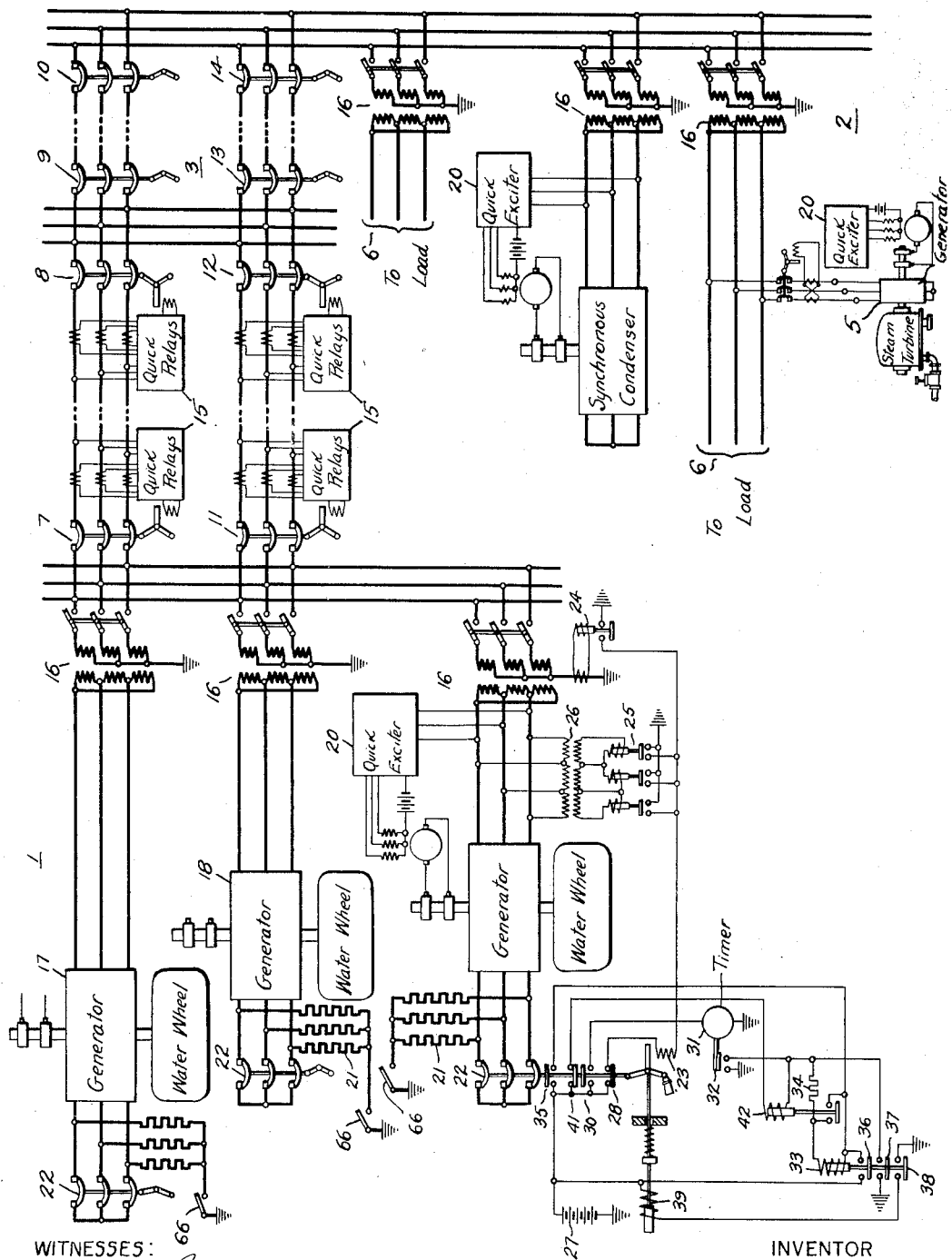

1,935,259

UNITED STATES PATENT OFFICE 1,935,259

STABILITY-PRESERVING MEANS FOR TRANSMISSION SYSTEMS

Royal C. Bergvall, Wilkinsburg, Pa., assignor to Westinghouse Electric & Manufacturing Company, a corporation of Pennsylvania Application January 24, 1931. Serial No. 511,017

21 Claims. (Cl. 172—237)

My invention relates to electric power-transmission systems and it has particular relation to means, methods or systems for increasing the stability, the continuity of service and/or the power limits of an electrical system, comprising synchronous machines, at widely spaced points, connected through a transmission line, generally through step-up transformers, where the reactance of the system is such as to limit the power carrying capacity at which the transmission line may be operated without loss of stability or synchronism of its two ends during transient conditions.

In recent years great strides have been made in the art of increasing the stability of such synchronous transmission systems. The first significant improvement consisted in the introduction of quick excitation of the important stability-preserving synchronous machines, at the ends of the line, and sometimes, in accordance with the Baum Patent No. 1,617,007, February 8, 1927, at one or more intermediate points along the line. This quick excitation system is described in Evans et al. Patent No. 1,692,495, November 20, 1928. The next improvement to be published, along the lines of increasing the system stability, involved the quick clearing of faults, in accordance with an application of Robert D. Evans et al., Serial No. 403,390, filed October 30, 1929, and assigned to the Westinghouse Electric and Manufacturing Company. According to this system, the transmission line was enabled to ride through many double-phase faults without loss of synchronism, but it could withstand very few 3-phase faults, except in some lines where the load was very small at the time of the fault.

My invention takes advantage of the fact that many or most transmission problems have to do with the transmission of electric power, from a sending station in which the aggregate electrical inertia or stored energy of the synchronous machines is low, to a receiving system, such as a large metropolitan area, in which aggregate electrical inertia or stored kinetic energy of the synchronous machines is several times that of the sending system. In such a transmission system or problem, when a fault is introduced on the transmission line, the energy which is transmitted electrically by the line is reduced. Thus, when the most severe kind of fault, a 3-phase fault, occurs, the line voltage at the fault is reduced practically to zero, so that no power is transmitted over the line, the load on the generator being very small on account of the high ratio of reactance to resistance. Under such circumstances, the low-stored-energy generators begin to advance very rapidly in phase position, due to the continuance of the prime-mover energy which cannot be immediately reduced. At the same time, the synchronous machines at the receiver end begin to fall back in phase very slowly, because of the large amount of inertia which is available at the receiving end to supply the deficiency between the input and the load. According to my invention, I provide means for reducing this rapid falling out of phase resulting from the disparity between the energy input and the energy output of a synchronous machine on a transmission line during times of fault.

With the foregoing and other objects in view, my invention consists in the circuits, apparatus, methods and systems hereinafter described and claimed and illustrated in the accompanying drawings, wherein Figure 1 is a diagrammatic view of circuits and apparatus embodying my invention in one illustrative example, Fig. 2 is a schematic single-line diagram illustrative of my system, Figs. 3 and 4 are power-angle diagrams comparing the system with and without my invention, Fig. 5 is a vector-position diagram giving the same comparison, and Fig. 6 is a view illustrating the application of my invention in a system in which power is transmitted through a transmission line and a frequency converter.

Before discussing my invention in detail I shall, for the purpose of fixing our ideas on something tangible, refer to an illustrative system which is shown in Fig. 1. In this system, a hydro-electric plant or system 1 is illustrated, although a steam turbine generator plant having a relatively low stored kinetic energy per transmitted kilowatt might also be utilized. The energy from the sending system 1 is transmitted to a load station or system 2 by means of a multi-circuit transmission line 3, illustrated as comprising two circuits of 3 phases each. The load system will, in general, comprise a large synchronous condenser 4 or a plurality of such machines, one or more steam turbine generators 5, and numerous load feeders 6, of which only two are illustrated, emanating from the load center at the receiving end of the transmission line, so that the aggregate stored kinetic energy of the synchronous machine in the receiving system is significantly larger than the stored kinetic energy of the synchronous machines in the sending system. In general, this energy is lower in a water-wheel generator, because of its slow speed, than in a steam turbine generator, so that my invention is well adapted to hydro-electric stations, although it is applicable also to steam electric stations in which the aggregate synchronous kva capacity of the sending station is considerably less than the aggregate synchronous kva connected to the receiving station or load center.

The term "transmission line", as used in this specification and in the appended claims, contemplates either a single line or a plurality of lines, such as a multi-circuit transmission system, for example. Each line or circuit, in general, will comprise three conductors of a 3-phase transmission system.

The transmission line 3 is provided with a plurality of pairs of sectionalizing circuit breakers 7, 8; 9, 10; 11, 12; and 13, 14, each provided with a selectively operating, fault-responsive, quick-acting relay system 15 of any preferred form, such as the relay systems shown in the Evans et al. application, Serial No. 403,390, above mentioned, or in the applications of Shirley L. Goldsborough, Serial Nos. 448,937 and 448,938, filed May 1, 1930. As these, or similar, quick-acting relay and breaker systems have been sufficiently well described in the technical press, no further description thereof is deemed necessary in this application. It may be noted that the sectionalizing circuit breakers 7 to 14 are of the trip-free, quick-acting type capable of clearing a fault within 12 cycles, sometimes 8 cycles, and sometimes fewer cycles, after the occurrence of a fault. The relays require a very short time, as compared to the circuit-breaker time, in order to respond to a fault and to selectively energize the tripping coils of only those circuit breakers which are necessary to be tripped in order to clear the fault. In general, in accordance with my invention, it will not be necessary to utilize means for causing both ends of a line-section to be tripped simultaneously, in the event of faults occurring close to either end of the line section, providing that each end of the faulty section clears quickly, as above described, so that the end farthest from the fault clears within about 16 cycles, when 8-cycle breakers are utilized, or 24 cycles, when 12-cycle breakers are utilized.

Throughout this description, except where otherwise specifically noted, a 60-cycle system is contemplated. It will be understood, however, that my invention is not limited to any particular frequency.

My invention is particularly applicable to a transmission system of such high voltage as to require step-up transformers 16 at both ends of the transmission lines, to step up the generated voltage to the transmission-line voltage and to step it down again to a more conveniently usable machine- and distributing-voltage at the receiver end.

By way of example, a sending station having three water-wheel generators 17, 18 and 19 is illustrated, the number chosen being purely arbitrary and solely for the sake of illustration. Each of the water-wheel generators 17, 18 and 19 at the sending end, as well as the important synchronous machines 4 and 5 at the receiver end, is provided with a quick-response excitation system 20 in accordance with the Evans et al. Patent No. 1,692,495 hereinabove mentioned. The purpose and effect of this quick-response excitation will be explained more at length hereinafter.

In accordance with my invention, I equip each of the generators 17, 18 and 19 with a temporary loading means in the shape of series resistances, preferably in the shape of a Y-connected resistance bank 21 in the neutral of the generator armature circuit. The advantage of utilizing such Y-connected resistor banks associated with each generator is that, as different generators are switched into and out of service, the ratio between the effective resistance and effective generator-to-fault reactance may be kept substantially constant. It will be understood, however, that the resistances may be connected anywhere in the circuit, as in series with the neutrals of the high-voltage transformer windings at the sending station, or in the lines themselves.

The resistances 21 are normally short circuited by auxiliary circuit breakers 22, only one of which is illustrated in detail, with appropriate controlling means therefor. These circuit breakers are also quick acting, and as they are of much smaller capacity than the sectionalizing circuit breakers 7 to 14, they may readily be made considerably faster in their operation. They are tripped by any sort of relaying apparatus which is responsive to a fault anywhere on the system, or in any predetermined portion of the system, such as by means of a low-voltage relay, an over-current relay, a residual-current relay, or any other means properly responsive to a fault on any one of a plurality of transmission-line sections or on the transmission line, in general, regardless of the number of sections.

By way of illustration, in Fig. 1, the tripping coil 23, of the auxiliary breaker 22 for normally short circuiting the resistance device 21, may be energized by means of a residual-current relay 24 which responds to residual current flowing in the grounded neutral of the high-voltage windings of one of the step-up transformers 16, which responds whenever there is any ground current on the system. The trip coil 23 is also energized in response to the operation of any one of three low-voltage relays 25 which are energized from suitable potential transformers 26, and which close their contacts whenever the voltage in any phase falls below a predetermined value, thus providing a sure indication of the presence of a short circuit anywhere in the system. The energy for the excitation of the tripping coil 23 is provided from any suitable source such as the battery 27, and the energizing circuit is broken by the usual back contacts 28 on the circuit breaker 22 when the circuit breaker is open, so that current will flow through the tripping coil only during the brief time necessary to open the breaker.

It is necessary to provide automatic means for reclosing the auxiliary breakers 22 in a suitable time, of from about one-half second to about five seconds, as will be discussed hereinafter. The means adopted for this purpose, in the illustrative system shown in Fig. 1, consists of a second back contact 30 on the auxiliary breaker 22. This back contact 30 closes when the circuit breaker is opened, and supplies power from the battery 27 to a timing switch 31 which closes its contacts 32 in a predetermined time, thereby energizing the relay 33 through a resistor 34 and a third back contact 35 on the auxiliary breaker 22. The third back contact 35 is closed when the circuit breaker is open, thereby imposing a further safeguard against improper actuation of the relay 33. As soon as the relay 33 picks up, a contact member 36 carried thereby bypasses the back contacts 35 of the auxiliary breaker 22; a second contact member 37 carried thereby bypasses the timer contacts 32, and a third contact member 38 carried thereby completes a circuit from the battery 27 through the closing coil 39 of the auxiliary breaker, thereby starting to close the breaker.

When the auxiliary breaker is very nearly closed, a special back contact 41 thereon is closed, thereby connecting the battery 27 to a relay 42, the circuit being completed through the contact member 37 of the first relay 33. The relay 42 thereupon picks up, so that its contacts short circuit the energizing coil of the first relay 33, thereby beginning to deenergize the latter. Advantage is taken of the stored electromagnetic energy in the relay 33, and of the fact that it takes some time to deenergize it, so as to give the auxiliary circuit breaker 22 time to become fully closed before the relay 33 drops its contact members and interrupts the current flowing through both the closing coil 39 and the second relay 42. It will be noted that the resistor 34, in series with the actuating coil of the first relay 33, prevents the short circuiting of the battery 27 when the second relay 42 is actuated.

Any suitable reclosing means may be utilized for the auxiliary circuit breakers 22. Although it is not essential, I would prefer, in general, to provide a separate tripping and closing means for each of the resistors 21, so that the generators 17, 18 and 19 may be switched in and out, as units, without complicating the relay equipment.

Fig. 2 is a schematic single-line diagram, showing typical resistances and reactances, of a hydro-electric system utilizing my invention, to which reference will be made in explaining the action of the series resistance during and after a fault. The impedance proportions indicated in this figure are typical, and the stored energy of the hydro-station is low relative to that of the load center. The 30% value indicated for the resistance 21, while suitable, is only illustrative. Values as high as 50% or 60% would serve as well, or even better. It will be understood that the resistances and reactances are given in percentages, which means that the resistance or reactance, as the case may be, multiplied by the full-load current, will give a voltage drop which is a certain percentage of the 100% voltage of the machine or system. The combined reactances of the generator 19 and of the associated step-up transformer 16 is given as 40%, this figure representing the transient reactance which is effective at the instant of occurrence of the fault.

The direct-axis transient reactance of a generator is the ratio, of the fundamental component of the reactive armature voltage due to the fundamental direct component of symmetrical armature current, to this component of current under suddenly applied load conditions and at rated frequency, the value of current to correspond to the projection of the envelope of the symmetrical current wave at the instant of the sudden application of load, neglecting the high-decrement currents during the first few cycles. In other words, the transient reactance is approximately the reactance that would be effective in determining the flow of short-circuit current during the transient conditions immediately following the occurrence of a fault, when the flux linkage with the field circuit of the generator is substantially constant. It will be noted that, by having a separate resistor 21 associated with each generator, the percentage resistance will always be the same, no matter how many generators are connected in the system.

Figs. 3 and 4 show the conditions produced on the system by a 3-phase fault near the load end, with and without the series resistance, respectively, for 8—16 cycle sequential circuit breaker clearing of the fault. A 3-phase fault is chosen for illustrative purposes, because it is the most severe fault. Obviously, if a system can be designed to withstand the severe 3-phase faults, it will as a consequence withstand other faults by a wide margin. The initial angular displacement for 100% load, and both lines in service, is 31°. When the short circuit occurs, the electrical output of the generator is decreased from 100% to 12% on account of the low power factor in the fault circuit. The prime mover continues to apply 100% torque to the generator, and the difference, or 88% torque accelerates the rotor of the generator.

Fig. 3 shows conditions without the use of series resistance. At the moment of short circuit marked, $t=0$, the system had been operating on a power-angle curve, a very small part of which is indicated at 50. The power output immediately reduces to 12% and remains steady for 8 cycles, as indicated by the horizontal line 51, until the circuit breaker closest the fault opens. During this time the angular displacement of the generator has increased from 31° to 69°. The system voltage is now partially restored, and some power is delivered to the load center, the system operating on a much lower power-angle curve 52. The difference between the ordinates of the 100% output line 53 and the curves 51 and 52 represents the prime-mover energy which is utilized to accelerate the rotor of the generator. At the end of 16 cycles, when the second sectionalizing breaker opens, thus fully clearing the fault, the angular displacement is 176°, and synchronism has been lost.

Fig. 4 shows the same fault and the same sectionalizing-circuit-breaker sequence, with 30% resistance inserted in series with the generator 6 cycles after the fault occurred. This series resistance causes the electrical output of the generator to increase from 12% to 110%, as indicated by the curve 54, even though no power is delivered to the load center through the 3-phase fault. With larger resistances, still more power can be drawn from the generator, the operation being illustrated, however, with a 30% resistance. The opening of the circuit breaker nearest the fault, at the end of 8 cycles after the occurrence of the fault, transfers the system to a power-angle curve 55 which is much higher than the power-angle curve 52, having a maximum power of 152% as compared to 80% without the resistor. At the end of 16 cycles, a second sectionalizing circuit breaker opens, and the generator output will be increased, with a still higher power-angle curve 56 which has a crest of 190% as compared to 150% for the corresponding curve 57 in Fig. 3. The shaded area below the 100% line 53 represents input energy stored up in the prime mover, utilized in accelerating the rotor, whereas the equal shaded area above the line 53 indicates that this energy has been absorbed, and that the crest of the angular swing away from synchronism has been reached. It is evident that there is ample area available under the curve 55 in Fig. 4, so that synchronism would have been maintained even though the second sectionalizing breaker had not opened for a considerably longer period of time.

At the receiving end of the transmission line, the effect of the series resistance is to slightly decrease the height of its power-angle diagram, such as its operating curve 52 or 55 with one end of the faulty section open-circuited, or the operating curve 56 or 57 with the system operating on only one transmission line. Ordinarily, the difference between the sending and receiving curves is slight, due to the small resistance losses in the line. With a series resistor in circuit, the resistance losses may be considerable, so that the energy delivered to the receiver-end is considerably reduced during the period that the resistor remains in circuit. In view, however, of the relatively large kinetic energy stored up at the receiver-end, this deficiency in the input energy at the receiver-end does not cause a very great phase shift in the angular position of the rotor members of the synchronous machines at the receiver station.

Fig. 5 shows the influence of the series resistor on the angular positions of the generator and receiver voltages during the time necessary to clear the fault. In a typical instance, the initial angle between the internal generator voltage and the receiver voltage may be 31°, with both transmission lines in service. Without series resistance, the internal generator voltage $E_s$ at the sending station moves to $E_s'$ in 18 cycles. When the series resistance is used, so as to begin to retard the generators after 6 cycles, the generator voltage $E_s$ moves only to $E_s''$ in 18 cycles. The series resistance, therefore, decreases the angular displacement of the generators by the large angle $a_1$.

Considering the load center, the receiver voltage changes from the value $E_r$ to $E_r'$ in 18 cycles with no series resistance, which is a very small change, on account of the large stored energy at the receiver end of the system. With the series resistance, the receiver voltage changes a little bit more in phase, reaching a phase position $E_r''$ in 18 cycles, representing a very slight angular loss indicated by $a_2$. The gain, $a_1$ at the sending end, is very much larger than the loss of $a_2$ at the receiver end, and hence the use of series resistances very greatly reduces the initial phase-angle swing between the sending and receiver voltages.

The magnitude of the series resistance can be varied over a wide range, with practically the same results. It will be understood, from the foregoing, that the primary object of the resistance is not to reduce the kva requirements of the sectionalizing circuit breakers 7 to 14. In general, the series resistance reduces the short-circuit current, which must be handled by the sectionalizing breakers 7 to 14, by something of the order of only 20-30%. The optimum effect of the resistance is noted when it is equal to the reactance from the internal generator voltage to the fault, and it is desirable for the resistance to have approximately this value, although, in general, it may be economical to have it have a somewhat smaller value.

The series resistance should be inserted as soon as possible after a fault occurs. In no case should this time be greater than about 9 cycles on a 60-cycle system, and times are obtained as small as 6 cycles, as indicated in the foregoing discussion, and even 4 cycles, the last-mentioned time being so short that there is really no problem as to stability at all, if suitable resistances are connected in line or with the fault within such a short period of time.

The length of time that the series resistance is left in the circuit will depend upon the individual system under consideration. It is possible to remove the resistor at, or slightly after, the crest of the first phase swing of the system. In general, however, at least in the present state of the art, I believe it is better to leave the resistor in the circuit until the severe oscillations of the phase-swinging of the system are damped out, which occurs in two or three seconds, sometimes longer. The resistor can then be shorted out, without producing any appreciable disturbance on the system, as there are only 4° angular difference between the steady-state conditions with and without the series resistance at 100% load.

An advantage of leaving in the series resistance until the oscillations of the system have been substantially damped out is that the quick-response excitation will, in this time, have increased the internal voltages of the important synchronizing synchronous machines on the line, so that the system will then be operating on a very high power-angle curve. In other words, the system will be very rigid and its margin of stability will be very great, so that it will easily remain in step. Thus the quick-response exciting system cooperates directly with the quick clearing of the fault and the quick insertion of a series resistor, for a short period of time, to combine altogether to maintain synchronous operation under almost any conceivable condition of operation, when using my new stability system utilizing series resistors.

It is desirable to short out the resistance in steps so as to gradually shift the operating conditions back into the normal service condition without any resistance, thus avoiding any shock on the system. There are usually a number of machines in a station, so that, by using a number of different resistors, such as the neutral circuit resistors, these resistors can be shorted out successively by causing their auxiliary circuit breakers to be reclosed at slightly different times, thereby producing the same effect as cutting the resistance out in steps. This method applies particularly to systems in which the resistance is left in series with the line for a few swings of the transmission system, or until the amplitude of the swings has been largely damped out, referring, of course, to the swings incident to the fault and the clearing of the same. Where extremely fast insertion of the series resistance occurs, for example, within four cycles, or less, after the occurrence of a fault, it may be more desirable to insert the resistance and take it out again practically as fast as possible, using rather high resistances, in which case no particular timing would be observed.

Where the resistances are placed in the neutral connections of either the generator or the line transformer, they may be utilized also as a neutral grounding resistance, with the three legs in parallel, the grounding connection being indicated in Fig. 1 by the switch 66. The location of the resistance in the neutral connection is advantageous also, by reason of the fact that the resistance is isolated from the system in case of a failure of the resistance.

The discussion heretofore has related particularly to synchronous generators. In the case of synchronous motors at the receiving end of the transmission line, the effect of a short-circuit in the line is to reduce the terminal voltage of the motor, so that its electrical input decreases, while the load on the motor, of course, remains the same. The difference between the load and the input will, therefore, cause the motor to drop back in phase, in a motoring direction, quite rapidly, so that the remedy needed in this case is some means for causing the motor to quickly drop its load. This is easily effected in case of a rotary converter or a motor-generator set in which the electrical output of the generator end may be quickly dropped or reduced in value, as indicated in Fig. 6.

Fig. 6 illustrates a typical motor-generator frequency-changing system utilizing a motor-generator set comprising a synchronous motor 70 and a synchronous generator 71 supplying power to a large 25-cycle system 72 from the receiving end of a 60-cycle system 73 in which power is transmitted over a long transmission line 74 from a 60-cycle hydro-electric generating station 75, or other generating station having low stored energy as compared to the stored energy at the receiving end of the transmission line.

The generating station has one or more generators 76 equipped with series resistors 77 and auxiliary short-circuiting circuit-breaker means 78, as previously described.

At the receiver end, the synchronous motor 70 is unloaded, in response to a fault 80 on the 60-cycle transmission line 74, by the insertion of reactors 81 in series with the generator 70 of the motor-generator set. The reactors 81 are three single-phase reactors which are preferably connected in Y in the neutral circuit of the generator and may be grounded if desired. The terminals of the reactors are normally short-circuited by means of an auxiliary breaker 82 which is controlled in the same manner as the auxiliary breaker 22 in Fig. 1.

The effect of the series reactors is to temporarily unload the frequency-changer set and to prevent it from drifting out of phase in a motoring direction at the same time that the sending station 75 is drifting out of phase with the load end in a generator direction, as a result of the reduction in voltage caused by the fault 80.

This frequency-changer scheme is particularly effective in the case of a 60-cycle system having 60-cycle generators transmitting power over a transmission line to a remote 25-cycle system, or other low-frequency system, through a frequency-changer set. This is because one electrical degree in the 25-cycle system equals 2.4 electrical degrees in the 60-cycle system. By adding reactance in series with the 25-cycle generator, the generator output will be decreased on account of dropping the 25-cycle system to a lower power-angle diagram corresponding to the added reactance in the circuit. This reduction in the 25-cycle power will be effective through a wide range of electrical degrees in the 60-cycle system, the phase swing being 2.4 times as great in the 25-cycle system as in the 60-cycle system. When the fault 80, in the 60-cycle system, is cleared, the auxiliary circuit breaker 82, associated with the reactance 81 in the 25-cycle system, can be automatically reclosed, after an appropriate time interval, as heretofore described.

The foregoing illustrated systems are only typical, as my invention is not limited to any particular kind of transmission system. The transmission system may utilize either high-tension or low-tension switching or bussing. The resistances may be placed in any locations other than the generator neutrals, the only essential being that a resistance-device, or some other equivalent means, shall be utilized, which will load the generators during the fault, and usually for an appropriate time after the clearance of the fault, so as to retard, or reverse, the forward swinging of the phase-angle of the generator-rotor, as previously indicated.

It was intimated, at the outset of this specification, that my system far surpasses, in reliability and accomplishment, any other known means for preserving system stability, and so it does. I shall now point out some of the other advantages and economies secured by my system, as compared to the present tendencies and practices in regard to securing stability.

Heretofore, series resistance has been considered detrimental in transmission systems, because it decreases the power received at the load end. To deliberately increase the effective line resistance at a critical moment, when a fault occurs and when the ultimate of system stability is required, would seem, according to the ordinary teachings of the art, undesirable, because it decreases the transmissible power of the system during the fault. However, the series resistor increases the power output at the generator end, which, as I have pointed out above, materially reduces the forward phase shift of the generator rotor, which is usually by far the worst factor militating against system stability at times of fault. In the case of a three-phase short-circuit, any resistance that can be inserted in series with the generator before the fault is cleared helps the stability problem by reducing the generator swing without having any material effect on the receiver voltage phase swing, because the power transmitted to the receiver end is substantially zero anyway, this being true regardless of the relative stored energies of the generator and receiving ends. As previously pointed out, the series resistor is particularly advantageous where the stored energy at the generator end is relatively small, so that its phase swings would normally be proportionately large, if it were not for the introduction of the series resistance.

My series resistance system is particularly applicable to meeting the demand for a high degree of service continuity in large hydro-electric developments, or other low-stored-energy developments, which transmit at least 50% of their output over long transmission lines exposed to lightning, or other causes of line faults. My resistance system overcomes the necessity for carrying excessive amounts of steam generator kva floating on the line, near the load center, to take up the load in case of failure of the transmitted electric power, due to loss of synchronism in the transmission line. Some companies have even gone so far as to reduce the output of their hydro-electric plant during a storm, but this involves risk, because the storms cannot be anticipated all along the line.

Many expedients have been proposed in an attempt to overcome the stability difficulties which I have met by my series resistor system. For example, there has been a belief that abnormally large flywheel effects must be used with hydro-electric generators, thus materially increasing the generator costs. Resort has also been had to special electrical designs (at considerable increased cost) for lowering the reactance of the generator or transformer, particularly in water-wheel generators, where the reactance runs high, in normal, or economical, designs. To fix our ideas on some definite figure, it may be considered that a normal water-wheel generator design will result in a transient reactance of about $$X = 310\% \text{ times } (R.P.M.)^{-.26} \text{ times } (kva)^{-.09},$$

where R. P. M. is the speed and kva is the continuous rating of the machine. These figures apply to water-wheel generators, where the range of speed is in the neighborhood of 100 to 500 revolutions per minute, and the rating ranges from 5,000 kva, or lower, to 50,000 kva, or more. The use of special damper windings on the generators has also been proposed or considered, for improving the transient stability limit of the system.

Another advantage of my series resistance system is that it avoids the necessity for special high-frequency tripping schemes for obtaining simultaneous tripping of the sectionalizing circuit breakers at both ends of a faulty section. I do not mean, by this, that the old slow sequential tripping systems, which were in vogue prior to the introduction of high speed clearing of faults, may be used. But, where the system utilizes high-speed breakers, with appropriate high-speed relays, as described in the previously mentioned Evans et al. application, Serial No. 403,390, it is not necessary to resort to the use of pilot wires or high-frequency relaying schemes in order to prevent the sequential tripping of the two ends of a faulty section in cases when the fault occurs very close to one of the ends of the line-section. My series-resistance, stability-preserving means provides a sufficiently wide margin of safety, so that, in general, sequential tripping of the sectionalizing circuit breakers may be tolerated, and sometimes it is even possible to get along without the very high speeds of circuit breaker operation for clearing the faulty section. Thus, it is frequently possible to use 12-cycle breakers instead, for example, of 8-cycle breakers. In any event, the fault should be entirely cleared from the transmission line in less than one-half of a second. By permitting sequential fault clearance for some faults, my system results in a saving in the first cost of a high-frequency simultaneous-tripping relay system, or a saving in the annual charges, if telephone circuits are used for simultaneous tripping purposes. Furthermore, I avoid the possibility of dropping the entire sending station, due to faulty operation of such simultaneous-tripping means.

My series resistance system also avoids or reduces the necessity for grounding transformer neutrals of transmission lines through impedance devices. These impedance grounds have been utilized on account of stability problems at times of double-phase-to-ground faults. My system makes it possible, if desired, to solidly ground the transmission system, thereby making it possible to take advantage of graded insulation, on high-voltage systems, resulting in considerable saving in cost and efficiency.

It has already been pointed out that my invention enormously reduces the frequency with which loss of synchronism is experienced, in transmission systems, and, in fact, makes it possible to design a transmission system which will not fail as a result of any reasonably conceivable fault on the transmission line. My system might easily result in the elimination of one line or circuit in a transmission system which would otherwise require three or more lines or circuits, or the base load of a transmission system could be increased more than 50%, when utilizing my series resistance system, than without it. My system is further advantageous, in that it can be added to an existing installation which is found to need more stability. My system further makes it unnecessary to attempt the construction of a lightning-proof transmission line.

A three-phase series-resistance device for a 30,000 kva generator weighs 5400 pounds. Its size is 10 feet by 7 feet by 6 feet high, which is about the same size as the commonly used neutral resistors. It is rated at 2000 amperes for 10 seconds and costs about $1,000, or, with its auxiliary breakers and relaying equipment, the cost runs to above $12,000. These figures are simply illustrative, and should be compared with a 30,000 kva generator of perhaps 40 feet diameter and a cost of perhaps $250,000.

As an indication of the kind of savings which are effected in a single hydro-electric station comprising six 30,000 kva generators, it may be noted that my series resistance system permits the use, for example, of generators of normal electrical design, having 38% reactance, instead of special generators of 30% reactance, thereby saving some $50,000 on the six machines. The use of my system makes it possible to omit an impedance of possibly 15% reactance in the neutrals of the transformers, saving another $15,000. Something like $40,000 would be saved by avoiding the necessity for a simultaneous relaying scheme. In addition, other expenses, such as putting additional inertia in the generators, or adding damper windings, and other expedients, may be saved by utilizing my system.

The stability-preserving system which constitutes the subject matter of my present application, or at least parts of said system, are described and explained, in certain features somewhat more at length, in my paper entitled "Series resistance method of increasing transient stability limit", which is to be presented at the winter convention of the American Institute of Electrical Engineers on January 27, 1931.

I claim as my invention:

1. An alternating-current transmission system comprising synchronous electric machines and a transmission line connecting the same, said line having fault-responsive sectionalizing means, generator-loading means in the form of a resistance device so arranged that it is in series relation to the line and to a synchronous generator, an auxiliary circuit breaker for normally short-circuiting said resistance device, fault-responsive means for opening said auxiliary breaker, and means for automatically removing said resistance device from series circuit relation to said generator.

2. An alternating-current transmission system comprising synchronous electric machines and a transmission line connecting the same, said line having fault-responsive sectionalizing means, generator-loading means in the form of a resistance device so arranged that it is in series relation to the line and to a synchronous generator, an auxiliary circuit breaker for normally short-circuiting said resistance device, fault-responsive means for opening said auxiliary breaker, and means for automatically reclosing the same, thereby removing said resistance device, in a predetermined time such as to enable the system, in general, to remain in synchronism.

3. An alternating-current transmission system comprising synchronous electric machines and a transmission line connecting the same, said line having a plurality of pairs of selectively-actuated fault-responsive relay-controlled breakers, generator-loading means in the form of a resistance device so arranged that it is in series relation to the line and to a synchronous generator, an auxiliary circuit breaker for normally short-circuiting said resistance device, fault-responsive means for opening said auxiliary breaker, and means for automatically reclosing the same after the appropriate pair of line-sectionalizing breakers have opened.

4. An alternating-current transmission system comprising synchronous electric machines and a transmission line connecting the same, said line having a plurality of pairs of selectively-actuated fault-responsive relay-controlled breakers, generator-loading means in the form of a resistance device so arranged that it is in series relation to the line and to a synchronous generator, the equivalent resistance of said resistance device being less than the equivalent reactance between the internal voltage of said generator and the furthest expectable fault on the line, an auxiliary circuit breaker for normally short-circuiting said resistance device, fault-responsive means for opening said auxiliary breaker, and means for automatically subsequently reclosing the same.

5. An alternating-current transmission system comprising one or more synchronous generators, one or more transmission lines supplied thereby, and one or more synchronous machines at a remote point or points in said line or lines, characterized by a plurality of pairs of sectionalizing breakers in said line or lines, generator-loading means in the form of a series resistance device or devices in series circuit relation to the line and to said generator or generators, an auxiliary circuit breaker or breakers normally short-circuiting said resistance device or devices, means responsive to a fault anywhere in any one of a plurality of sections of said transmission line or lines for quickly open-circuiting said auxiliary breaker or breakers, means for automatically subsequently reclosing the same, and means selectively responsive to a fault in any line section for selectively open-circuiting its appropriate pair of sectionalizing breakers for ridding the system of said fault.

6. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance, the combination, with said system, of generator-loading means in the form of series resistance inserted in the line during a fault, quick-acting fault-responsive means for automatically inserting said resistance in series relation to the line, quick-acting, selectively operative, fault-responsive means for ridding the system of the fault, and means for automatically removing said resistance from the circuit.

7. As a means for increasing the stability and the power limits of an electrical system comprising synchronous machines connected through a three-phase transmission line comprising a three-phase power-line section equipped, at each end, with a circuit-breaker means and a selectively operative, fault-responsive relaying means therefor, each circuit-breaker means and relaying means being operative to open-circuit its end of the faulty power-line section within one-half of a second after the occurrence of a fault in its section, quick-acting generator-loading means, responsive to a fault somewhere in the electrical system, and operative to insert a series resistance in said system in such relation that said series resistance is traversed by current which is delivered to the fault, and automatic means for subsequently removing said resistance.

8. As a means for increasing the stability and the power limits of an electrical system comprising synchronous machines connected through a three-phase transmission line comprising a three-phase power-line section equipped, at each end, with a circuit-breaker means and a selectively operative, fault-responsive relaying means therefor, each circuit-breaker means and relaying means being operative to open-circuit its end of the faulty power-line section within one-half of a second after the occurrence of a fault in its section, quick-acting generator-loading means, responsive to a fault somewhere in the electrical system, and operative to insert a series resistance in said system in such relation that said series resistance is traversed by current which is delivered to the fault outside of the power-line section in which the fault lies, and automatic means for subsequently removing said resistance.

9. As a means for increasing the stability and the power limits of an electrical system comprising synchronous machines connected through a three-phase transmission line comprising a three-phase power-line, a Y-connected three-phase resistance means connected in the neutral of each of at least some of the synchronous generators of said system, auxiliary relatively light-duty circuit-breaker means for normally short-circuiting the terminals of said resistance means, quick-acting means responsive to a fault somewhere in the electrical system for opening said auxiliary circuit-breaker means, and automatic means for subsequently again short-circuiting the terminals of said resistance means.

10. A three-phase transmission system comprising any number of a plurality of available three-phase synchronous generators, a multi-circuit three-phase line, a load including synchronous machines at a point or points remote from said generators, sectionalizing means for dividing said line into a plurality of line-sections, quick-acting selective fault-responsive means for removing a faulted section from the system in less than one-half of a second after the occurrence of a fault anywhere in its section, each generator having a three-phase resistance means associated in series circuit relation, auxiliary circuit-breaker means for normally short-circuiting said resistance means, means responsive to a fault anywhere in any one of a plurality of sections of said line for quickly open-circuiting the auxiliary circuit-breaker means of the resistance means associated with all of said generators, and means for automatically subsequently reclosing said auxiliary circuit-breaker means.

11. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance, some of said synchronous machines having several times as much stored energy, per kw rating, as others, the combination, with said system, of generator-loading means in the form of series resistance inserted in series with at least a plurality of the low-stored-energy machines during a fault, quick-acting fault-responsive means for automatically inserting said resistance in series relation to the line, quick-acting, selectively operative, fault-responsive means for ridding the system of the fault, and means for automatically removing said resistance from the circuit.

12. As a means for increasing the stability, the continuity of service and/or the power limits of an electrical system comprising synchronous machines connected through step-up transformers and multi-circuit polyphase transmission lines of such reactance that the power-carrying capacity, with stability, is limited by reactance, some of said synchronous machines having several times as much stored energy, per kw rating, as others, the combination, with said system, of generator-loading means in the form of series resistance inserted in series with at least all of the low-stored-energy machines during a fault, quick-acting fault-responsive means for automatically inserting said resistance in series relation to the line, quick-acting, selectively operative, fault-responsive means for ridding the system of the fault, and means for gradually removing said resistance from the circuit.

13. As a means for providing a high degree of service continuity in a large synchronous electric-generator development which transmits at least 50 per cent of its output over long transmission lines exposed to lightning and/or other causes of line faults, the combination, with a plurality of such generators and a multi-circuit transmission line of the class described, of means, at the generator station, for inserting a resistance in series with the line within nine cycles after the occurrence of a fault somewhere on the transmission line, said resistance being substantially equal to, or somewhat less than, approximately the reactance between the internal machine voltages of the generators and the most remote line-fault; selective, fault-responsive line-sectionalizing means for ridding the unfaulted part of the system of a fault on the line within one-half of a second after the occurrence of the fault, and means for automatically removing the resistance from the line at such time or times as to, in general, maintain the system stability.

14. As a means for increasing the stability and the power limits of an electrical system comprising synchronous machines connected through a multi-circuit three-phase transmission line comprising a three-phase power-line section equipped, at each end, with a quick-acting circuit-breaker means and a selectively operative, fault-responsive relaying means therefor, each circuit-breaker means and relaying means being operative to open-circuit its end of the faulty power-line section within about one-fifth of a second after the relay setting has been exceeded, quick-acting means responsive to a fault somewhere in the electrical system and operative to insert a series three-phase resistance in said system in such relation that said series resistance is traversed by current which is delivered to the fault, said resistance being substantially equal to, or somewhat less than, approximately the reactance between the internal machine voltage of a synchronous generator or generators and the fault; and means for automatically removing the resistance from the line at such time or times as to, in general, maintain the system stability.

15. As a means for increasing the stability and the power limits of an electrical system comprising synchronous machines connected through a three-phase transmission line comprising a three-phase power-line section equipped, at each end, with a quick-acting circuit breaker means and a selectively operative, fault-responsive relaying means therefor, each circuit-breaker means and relaying means being operative to open-circuit its end of the faulty power-line section within about one-fifth of a second after the relay setting has been exceeded, quick-acting means responsive to a fault somewhere in the electrical system operative to insert a series three-phase resistance in said system in such relation that said series resistance is traversed by current which is delivered to the fault, said resistance being so small that the current is reduced thereby only in the neighborhood of 20 to 30 percent, and means for automatically removing said resistance at approximately the optimum time or times with respect to maintaining system stability during the worst fault conditions.

16. A hydro-electric transmission system comprising synchronous machines connected through step-up transformers and multi-circuit polyphase transmission lines of such reactance that the power-carrying capacity, with stability, is limited by reactance, said system comprising hydro-electric synchronous generator means having a transient reactance of at least about 310 per cent times $(R. P. M.)^{-.26}$ times $(kva)^{-.09}$, where R. P. M. is the speed and kva is the continuous rating of the machine, a plurality of pairs of circuit-breaker means for sectionalizing said lines into a plurality of sections, a selective, fault-responsive relaying means, operative at least part of the time sequentially, for interrupting both ends of a faulted section, means for quickly inserting a resistance in series with the hydro-electric generator end of the transmission lines in response to a fault anywhere on the lines, said resistance being of the same order of magnitude as the reactance between the internal generator voltage and the most remote fault, and means for automatically removing said resistance at a time or times suited for maintaining system stability.

17. An alternating-current transmission system comprising synchronous electric machines and a transmission line connecting the same, generator-loading means in the form of series resistance of a magnitude appropriately adapted to prevent loss of stability during faults in the system, quick-acting fault-responsive means for automatically inserting said resistance in series relation to the line, and means for automatically removing the resistance from the line at such time or times as to, in general, maintain the system stability.

18. In a system of distribution, a distribution circuit, a synchronous alternating current generating source connected thereto for operation in synchronism therewith, serially connected resistance-means associated with said generating source and distribution circuit in such relation that said serially connected resistance means is traversed by the current which is delivered by said generating source to said distribution circuit, auxiliary switching means normally short-circuiting said resistance-means, and means operative in accordance with faults on said distribution circuit for opening said auxiliary switching means to maintain conditions for synchronous operation between said source and said distribution circuit.

19. In a system of distribution, an alternating current Y-connected generator, a transmission line connected to said generator, a plurality of Y-connected resistor units serially disposed in the neutral-point connections of said generator, auxiliary switching means normally short-circuiting said resistor units, and fault-responsive means operative when the load on said generator is suddenly changed for opening said auxiliary switching means.

20. In a system of distribution, a distribution circuit, a plurality of synchronous alternating current generating sources connectible thereto, an individual serially connected resistance-means permanently associated with each of said plurality of generating sources so that each individual serially connected resistance-means is traversed by the current which is delivered by its associated generating source to said distribution circuit, connecting means for connecting and disconnecting each generating source with its individual associated resistance means to and from said distribution circuit, auxiliary switching means individual to each generating source for normally short-circuiting its associated resistance means, means responsive to faults which decrease the load on said generating source for opening the auxiliary switching means of each of the affected generating sources when said distribution circuit is subjected to a fault, and means for again short-circuiting the several individual resistance-means when normal operating conditions are restored in said distribution circuit.

21. In a system of distribution, a distribution circuit, a plurality of synchronous alternating current generating sources connectible thereto, an individual serially connected resistance-means permanently associated with each of said plurality of generating sources so that each individual serially connected resistance-means is traversed by the current which is delivered by its associated generating source to said distribution circuit, connecting means for connecting and disconnecting each generating source with its individual associated resistance means to and from said distribution circuit, auxiliary switching means individual to each generating source for normally short-circuiting its associated resistance means, means responsive to faults which decrease the load on said generating source for opening the auxiliary switching means of each of the affected generating sources when said distribution circuit is subjected to a fault, and means for again short-circuiting the several individual resistance-means after different predetermined time-intervals.

ROYAL C. BERGVALL.